(12) United States Patent
Self et al.

(10) Patent No.: US 7,504,356 B1
(45) Date of Patent: Mar. 17, 2009

(54) NANOPARTICLES OF CERIUM OXIDE HAVING SUPEROXIDE DISMUTASE ACTIVITY

(75) Inventors: William T. Self, Oviedo, FL (US); Sudipta Seal, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 109 days.

(21) Appl. No.: 11/676,579

(22) Filed: Feb. 20, 2007

Related U.S. Application Data

(60) Provisional application No. 60/774,351, filed on Feb. 17, 2006.

(51) Int. Cl.
*B01J 23/10* (2006.01)
*B01J 37/00* (2006.01)
*C01B 15/01* (2006.01)
*C01F 17/00* (2006.01)

(52) U.S. Cl. .................. 502/304; 423/21.1; 423/263; 423/272; 435/1.1

(58) Field of Classification Search .............. 502/304; 423/21.1, 263, 272; 435/1.1
See application file for complete search history.

(56) References Cited

U.S. PATENT DOCUMENTS 7,141,227 B2 * 11/2006 Chan ........................ 423/263

OTHER PUBLICATIONS

Schubert et al., Cerium and yttrium oxide nanoparticles are neuroprotective, Feb. 3, 2006, Biochemical and Biophysical Research Communications, 342, p. 86-91.*
Zhang et al., Cerium oxide nanoparticles: Size-selective formation and structure analysis, Jan. 7, 2002, Applied Physics Letters, vol. 81 No. 1, p. 127-129.*

* cited by examiner

*Primary Examiner*—Timothy C Vanoy
*Assistant Examiner*—Serena L Hanor
(74) *Attorney, Agent, or Firm*—Allen, Dyer, Doppelt, Milbrath & Gilchrist, P.A.

(57) ABSTRACT

A synthetic catalyst providing superoxide dismutase activity consists essentially of monodispersed nanoparticles of cerium oxide having a crystal lattice containing cerium in mixed valence states of $Ce^{3+}$ and $Ce^{4+}$ wherein the $Ce^{4+}$ valence state predominates and containing an enhanced $Ce^{3+}/Ce^{4+}$ ratio and an effective number of oxygen vacancies in the crystal lattice so as to increase catalytic efficiency. A method of making the synthetic catalyst includes dissolving hydrous $Ce(NO_3)_3$ in water so as to form a solution, stirring the solution, adding hydrogen peroxide, heating and stopping when the solution develops a light yellow color.

18 Claims, 4 Drawing Sheets

NANOPARTICLES OF CERIUM OXIDE HAVING SUPEROXIDE DISMUTASE ACTIVITY

RELATED APPLICATION

This application claims priority from co-pending provisional application Ser. No. 60/774,351, which was filed on Feb. 17, 2006, and which is incorporated herein by reference in its entirety.

STATEMENT OF GOVERNMENT RIGHTS

The invention was made with at least partial Government support and the Government may certain rights in the invention, as specified by law.

FIELD OF THE INVENTION

The present invention relates to the field of nanotechnology and, more particularly, to nanoparticles of cerium oxide which provide the catalytic activity of superoxide dismutase and to methods of making and using same.

BACKGROUND OF THE INVENTION

Cerium is a rare earth element of the lanthanide series. The oxide form ($CeO_2$) has routinely been used in polishing glass, but current research is focused on use of cerium oxide nanoparticles in catalytic converters for automobile exhaust systems, oxygen sensors, an electrolyte for solid oxide fuel cells or as an ultraviolet absorbent. While most of the rare earths exist in a trivalent state (+3), cerium also occurs in a tetravalent (+4) state and may flip-flop between the two in a redox reaction. It is established that cerium oxides make excellent oxygen buffers, because of this redox capacity. As a result of alterations in cerium oxidation state, cerium oxide forms oxygen vacancies or defects in the crystal lattice structure by loss of oxygen and/or its electrons. The valence and defect structure of cerium oxide is dynamic and may change spontaneously or in response to physical parameters such as temperature, presence of other ions, and partial pressure of oxygen.

Studies have shown that with decrease in particle size, cerium oxide nanoparticles show formation of more oxygen vacancies within their crystal lattice. We hypothesized that the increased surface area to volume in nanoparticles enables $CeO_2$ to regenerate its activity and thereby act catalytically. In the case of transition metal oxides, a thorough analysis of vacancies has lead to the understanding of the fundamental nature of the catalytic reactivity. However, this knowledge has been lacking with respect to the rare earth oxides. In addition, there has been no reported literature elucidating the molecular mechanism of any catalytic activity of these nanoparticles in biological systems.

Cerium oxide nanoparticles have a unique electron structure that is similar to chemical spin traps such as nitrosone compounds and mixed valence state ceria nanoparticles have been recently shown to apparently act as biological antioxidants. It has been proposed that this antioxidant activity is mediated at oxygen vacancies at the surface of the nanoparticle. If so, then one cerium oxide nanoparticle may offer many sites for catalysis, whereas pharmacological agents or enzymes offer only one active site per molecule. In addition, the electron defects in ceria nanoparticles may not be destroyed after their initial reaction with reactive oxygen species and thus these nanoparticles may be potent catalysts in a living cell. Although there is growing evidence that ceria nanoparticles impart protection to living cells, the molecular mechanism of the antioxidant properties of cerium oxide nanoparticles has yet to be elucidated. Previous studies have suggested, based on observations of the impact of ceria nanoparticles on cultured cells, that ceria nanoparticles can act as radical scavengers and redox cycling antioxidants.

SUMMARY OF THE INVENTION

Disclosed herein is a synthetic catalyst providing superoxide dismutase activity. The synthetic catalyst comprises substantially monodispersed nanoparticles of cerium oxide having a crystal lattice containing cerium atoms in mixed valence states of $Ce^{3+}$ and $Ce^{4+}$ wherein the $Ce^{4+}$ valence state predominates and having an effective number of oxygen vacancies in the crystal lattice.

Wishing not to be bound by the following explanation, the synthetic catalyst is theorized to provide superoxide dismutase activity demonstrating a positive correlation with number of oxygen atom vacancies in the crystal lattice. Additionally, it is also theorized that the superoxide dismutase activity has a positive correlation with content of $Ce^{3+}$ in the crystal lattice.

Typical of the synthetic catalyst disclosed herein are substantially monodispersed nanoparticles of cerium oxide ranging in size from approximately 1 to 50 μm. Moreover, these nanoparticles are preferably formed containing a ratio of $Ce^{3+}/Ce^{4+}$ sufficiently large to provide a catalytic rate constant equal to or higher than the catalytic rate constant of natural superoxide dismutase.

The invention also includes a method of making a synthetic catalyst having superoxide dismutase activity and consisting of a plurality of substantially monodispersed nanoparticles of cerium oxide having a crystal lattice containing cerium in a mixed valence state of $Ce^{3+}$ and $Ce^{4+}$, wherein the superoxide dismutase activity correlates with number of oxygen vacancies in the crystal lattice. A preferred method of the invention includes dissolving hydrous $Ce(NO_3)_3$ in water so as to form a solution, stirring the solution, adding 30% hydrogen peroxide solution and 30% ammonium hydroxide solution, and heating until the solution develops a light yellow color; thereafter, the method stops. Preferably, in the method the water is deionized and stirring is continuous. Also, it is preferable that adding of the hydrogen peroxide be done rapidly while continuously stirring the solution. The hydrogen peroxide is preferably a 30% solution and the ammonium hydroxide is a 30% solution; they are added in a proportion of 2:1 hydrogen peroxide to ammonium hydroxide. Heating is best conducted at approximately 150° C.

The invention further includes methods of using the disclosed synthetic catalyst. For example, a method of treating a biological tissue to reduce oxidative stress comprises contacting the biological tissue with substantially monodispersed nanoparticles of cerium oxide having a crystal lattice containing mixed valence states of $Ce^{3+}$ and $Ce^{4+}$ and sufficient oxygen vacancies to effectively scavenge reactive oxygen species before these contact the biological tissue. The biological tissue may include a tissue culture and the tissue may comprise animal cells, mammalian cells or human cells.

Additionally, the invention includes a method of enhancing cell longevity by contacting the cell with nanoparticles of crystalline cerium oxide containing mixed valence states of $Ce^{3+}$ and $Ce^{4+}$ and bearing sufficient oxygen vacancies to scavenge reactive oxygen species. Cells may also be protected against irradiation damage by contacting the cell with substantially monodispersed nanoparticles of cerium oxide containing mixed valence states of $Ce^{3+}$ and $Ce^{4+}$ in a crystal lattice having sufficient oxygen vacancies to effectively scavenge reactive molecular species generated by the irradiation.

Yet additionally, the invention includes a method of catalyzing conversion of superoxide into hydrogen peroxide by contacting the superoxide with one or more nanoparticles of cerium oxide having a crystal lattice containing mixed valence states of $Ce^{3+}$ and $Ce^{4+}$ and with sufficient oxygen vacancies to function effectively as a synthetic equivalent to superoxide dismutase.

BRIEF DESCRIPTION OF THE DRAWINGS

Some of the features, advantages, and benefits of the present invention having been stated, others will become apparent as the description proceeds when taken in conjunction with the accompanying drawings, presented for solely for exemplary purposes and not with intent to limit the invention thereto, and in which.

DETAILED DESCRIPTION OF THE PREFERRED EMBODIMENT

Figure 1:
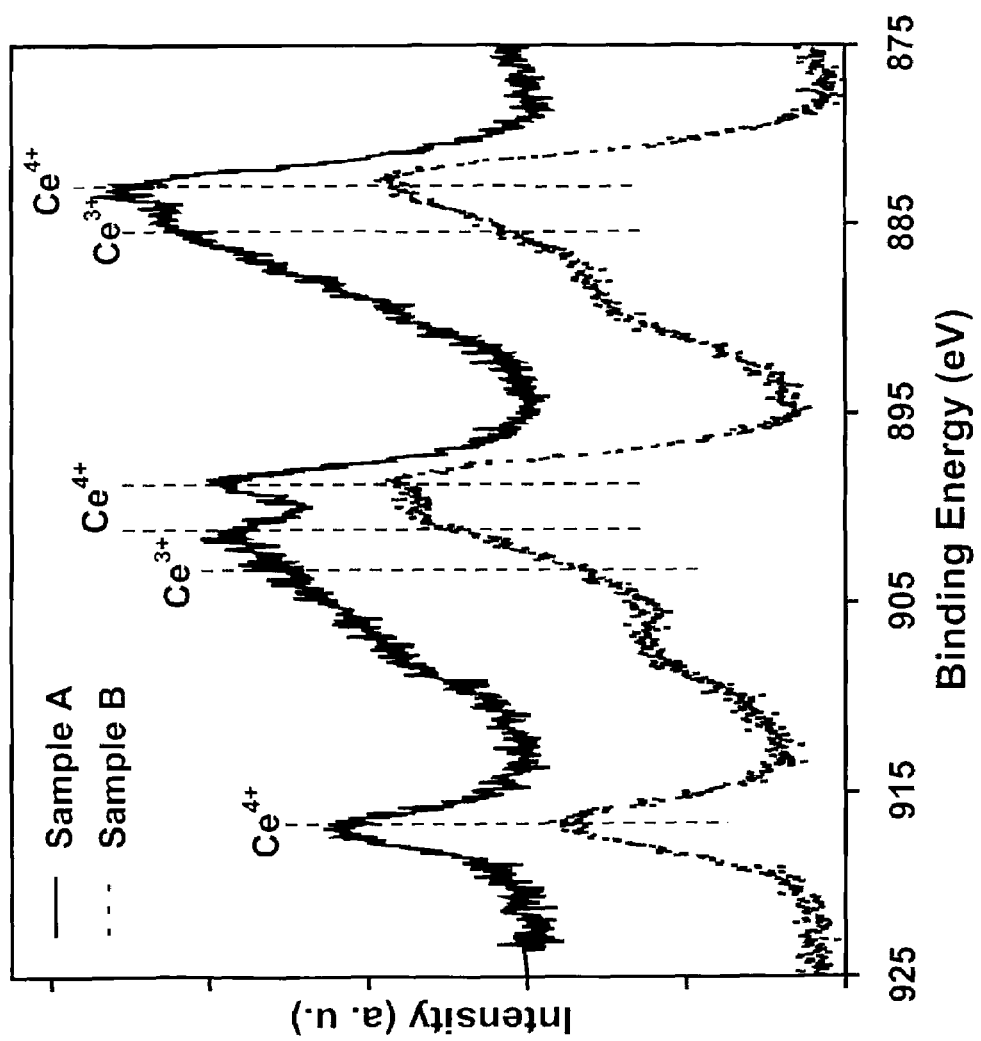
FIG. 1 is a Ce 3d high resolution XPS analysis revealing higher $Ce^{3+}$ levels in sample A as compared to sample B, according to an embodiment of the present invention.

The present invention will now be described more fully hereinafter with reference to the accompanying drawings, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein could be used in the practice or testing of the present invention, suitable methods and materials are described below. Any publications, patent applications, patents, or other references mentioned herein are incorporated by reference in their entirety. In case of conflict, however, the present specification, including any definitions, will control. In addition, it should be understood that the materials, methods and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description, and from the claims.

Methods and Materials

Ceria nanoparticles preparation. The ceria nanoparticles were synthesized by wet chemical process. All the chemicals were obtained from Sigma-Aldrich Chemicals Inc. For preparation of sample A, $Ce(NO_3)_3 \cdot 6H_2O$ was dissolved in deionized water and 2 ml of 30% $H_2O_2$ and 1 ml of 30% ammonium hydroxide was rapidly added with stirring at about 300 rpm. The solution was then heated at 150° C. with continuous stirring to obtain a light yellow colored stable dispersion of cerium oxide nanoparticles. The sample B was prepared by traditional homogeneous precipitation method. $Ce(NO_3)_3 \cdot 6H_2O$ was dissolved in deionized water and pre-determined amount of ammonium hydroxide was added to the solution with continuous stirring. The precipitate was separated and dried at 80° C. and then calcined at 200° C. to obtain larger particle size. The particles were then redispersed in acidic water (1.5 pH) to obtain a stable dispersion of nanoparticles.

Transmission Electron microscopy of ceria nanostructures. The particle morphology of ceria nanoparticles was studied using high resolution transmission electron microscopy (HR-TEM). Ceria nanoparticles were deposited on a carbon coated copper grid for HRTEM analysis by the dipping method. The HRTEM images of prepared particles were obtained with a Philips (Tecnai Series) transmission electron microscope at 300 keV.

X-ray photoelectron spectroscopy. The surface chemistry of the cerium oxide nanoparticles was studied using X-ray photoelectron spectroscopy (XPS) using a 5400 PHI ESCA (XPS) spectrometer. The base pressure during XPS analysis was $10^{-9}$ Torr and $Mg$-$K_\alpha$ X-ray radiation (1253.6 eV) at a power of 200 watts was used. The binding energy of the Au ($4f_{7/2}$) at 84.0±0.1 eV was used to calibrate the binding energy scale of the spectrometer. Any charging shift produced in the spectrum by the sample was carefully removed by taking C (1s) position (284.6 eV) as a reference line. Deconvolution of the XPS spectra was carried out using PeakFit (Version 4) software.

X-ray diffraction (XRD) analysis. XRD analysis used X-ray diffraction (Rigaku model) with a Cu $K_\alpha$ radiation and operating conditions of 30 mA and 30 kV. The scanning rate was 0.2 degree/min with a step size of 0.01 degree.

Surface area measurements. The nanopowders of cerium oxide were prepared by drying the dispersions of samples A and B (prepared per the procedures given above). BET surface area of the nanopowders was obtained by physical adsorption of $N_2$ at −196° C. using NOVA 4200e surface area and pore size analyzer by Quantachrome Instruments. Prior to the measurements, the samples were degassed for 3 hrs.

Generation of superoxide. Superoxide ($O_2^-$) was generated by incubation of xanthine oxidase (Sigma, St. Louis, Mo.) with hypoxanthine as substrate as previously described by others. Hypoxanthine was present in all reactions at a concentration of 5 mM. To determine the level of superoxide generated under these experimental conditions, the reduction of ferricytochrome C (Sigma, St. Louis, Mo.) was monitored (change in absorbance at 550 nm) using a Spectramax 190 UV-visible spectrophotometer. Data were analyzed using Softmax Pro 5 (Molecular Devices, Palo Alto, Calif.) and SigmaPlot 8.0 (SPSS, Inc., Chicago, Ill.).

Detection of hydrogen peroxide. Hydrogen peroxide levels were assayed using Amplex Red kit from Molecular Probes (Eugene, Oreg.). Amplex Red (10-acetyl-3,7-dihydroxyphenoxazine) is converted to a fluorescent resorufin compound (excitation peak 571 nm, emission peak 585 nm) in the presence of hydrogen peroxide and horseradish peroxidase. Fluorescence of the resorufin compound was determined in white microplates (96-well) using a Varian Cary Eclipse Spectrofluorometer (Varian, Palo Alto, Calif.) with excitation at 530 nm and emission at 590 nm. The excitation slit width was 5 nm, emission slit width set at 20 nm and a detector voltage of 400 V.

SOD mimetic kinetic assays. Competition for reduction of ferricytochrome C was utilized to assess the kinetics of the SOD mimetic activity of cerium oxide nanoparticles. Superoxide was generated by hypoxanthine/xanthine oxidase at a level that resulted in an absorbance change at 550 nm of approximately 0.025 units per minute. Reactions were carried out in 96-well plates and contained 100 µL total volume. CuZnSOD (Sigma, S8160, St. Louis, Mo.) was utilized as an internal control. Assays were carried out in Tris buffer (50 mM Tris-HCl, pH 7.5) at room temperature and the change in absorbance (550 nm) was monitored using a Spectramax 190 UV-visible spectrophotometer (Molecular Devices, Sunnyvale, Calif.). In reactions containing lower amounts of superoxide ($\Delta$550 nm<0.005/minute) no catalase was included. Reactions with higher levels of superoxide ($\Delta$550 nm 20.025/minute) 2,000 units of catalase were added to eliminate the reaction of ferricytochrome C (or nanoparticles) with hydrogen peroxide generated as a result of the SOD mimetic activity.

We tested the ability of mixed valence state ceria nanoparticles, with higher levels of Cerium in the 3+ state, to react with superoxide in vitro. Since it has been proposed that surface oxygen vacancies can mediate catalysis on ceria nanostructures, and that higher ratio of $Ce^{3+}/Ce^{4+}$ in nanoparticles preparation correlates with higher oxygen and electron vacancy, we tested two batches of ceria nanoparticles for their ability to react with superoxide.

Figure 2:
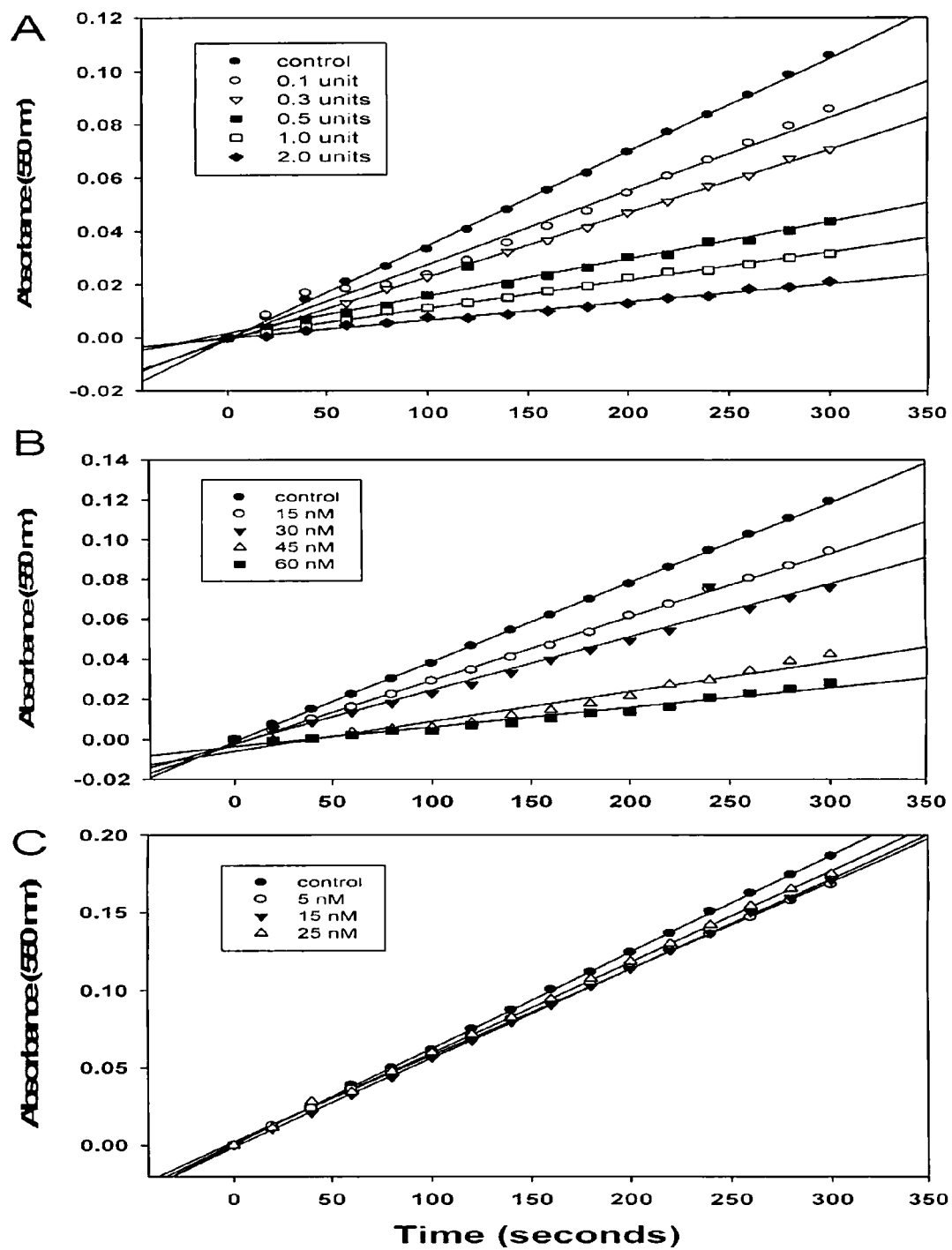
FIG. 2 shows line graphs of SOD mimetic activity of ceria nanoparticles assayed using ferricytochrome C.

Next we used X-ray diffraction (XRD) analysis (FIG. 2) to confirm that both preparations of ceria nanoparticles contain a fluorite crystal lattice. Peak broadening in sample A confirmed smaller particle size compared to sample B, which is consistent with the HRTEM analysis. The measured BET (Brunauer Emmett Teller) surface areas were also consistent with the HRTEM and XRD measurements. The specific surface areas of the samples A and B were found to be 140 and 115 m²/g, respectively. The Ce (3d) XPS spectra shown in FIG. 1 demonstrate the presence of a mixed valence state ($Ce^{3+}$ and $Ce^{4+}$) for both preparations. As shown in FIG. 1, the peaks between 875-895 eV correspond to Ce $3d_{5/2}$, between 895-910 eV correspond to Ce 3d3/2 and peak at 916 eV is a characteristic satellite peak indicating the presence of +4 states. The peaks at 880.2, 885.0, 899.5 and 903.5 eV are indicative of +3 peaks as opposed to 882.1, 888.1, 898.0, 900.9, 906.4 and 916.40 eV indicating the presence of +4 states. Note, the population density of +3 states in Sample A is higher than in Sample B. Higher intensity peaks corresponding to $Ce^{3+}$ were observed in sample A, indicating a higher $Ce^{3+}/Ce^{4+}$ ratio in this sample. The Ce (3d) XPS spectra were deconvoluted as described previously by S. Deshpande, S. Patil, S. Kuchibhatla and S. Seal, *Applied Physics Letters,* 2005, 87, and the concentration of $Ce^{3+}$ was calculated using the following equation:

$$[Ce^{3+}] = \frac{A_{v0} + A_{v'} + A_{u0} + A_{u'}}{A_{v0} + A_{v'} + A_{u0} + A_{u'} + A_v + A_v^n + A_v^m + A_u + A_u^n + A_u^m}$$

The $Ce^{3+}$ concentration in sample A was found to be 40 atom % while that in sample B was 22 atom %. These results are in line with our earlier studies of size dependent changes in valence state of cerium oxide nanoparticles which indicated increase in $Ce^{3+}$ with decrease in particle size. These two nanoparticles preparations allowed us to compare ceria preparation with varying surface chemistry for their potential interaction with superoxide.

Figure 3:
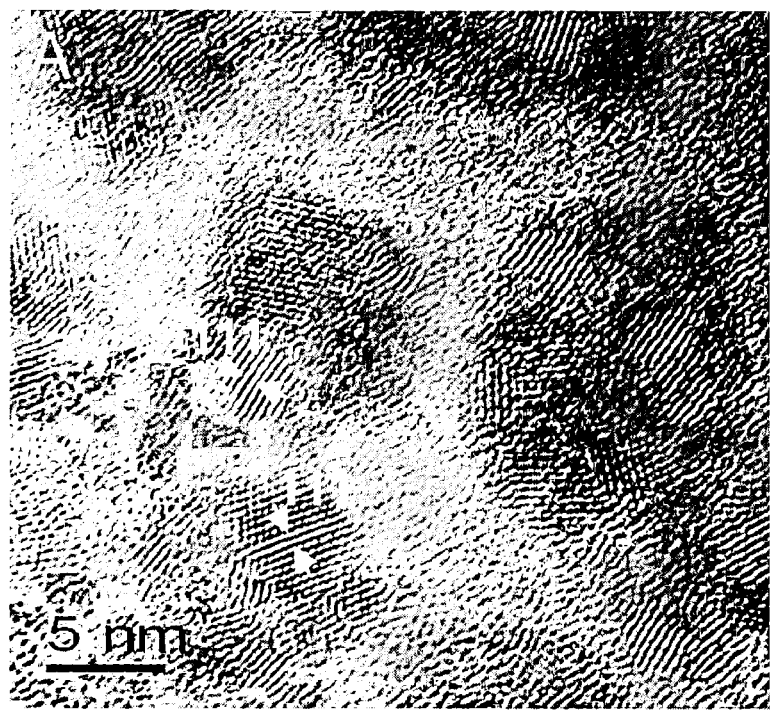
FIG. 3 shows high-resolution transmission electron microscopy (HRTEM) images of nanoceria preparations.
Figure 3:
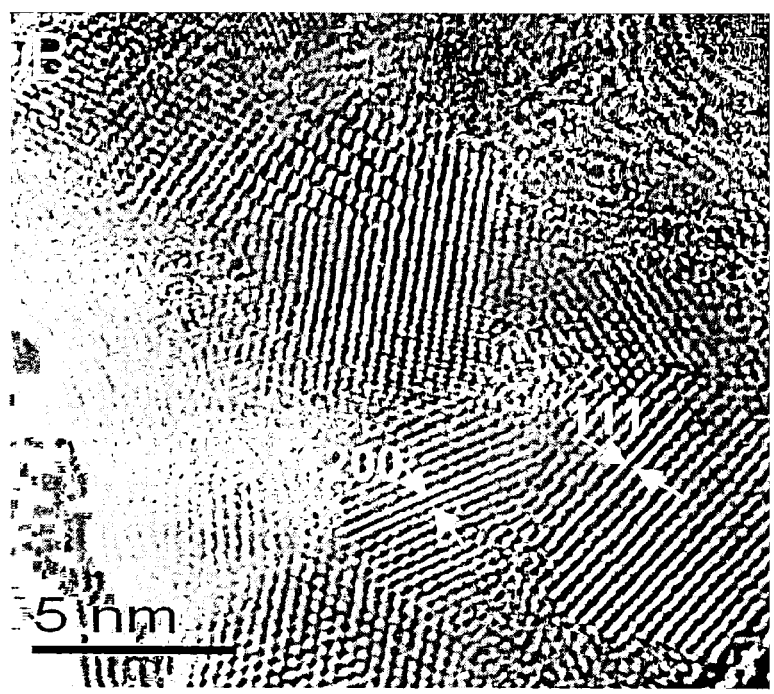

FIGS. 3A and 3B show HRTEM images of $CeO_2$ nanoparticle sample A indicating particle size of 10-15 nm with 3-5 nm crystals present and $CeO_2$ nanoparticle sample B showing particle size of 5-8 nm, respectively. The parallel lines observed in each individual ceria nanoparticle are the lattice fringes formed due to periodical arrangement of atoms in the ceria crystal. Arrows indicate the orientation of the nanoparticles on the TEM grid in specific direction found by determining the distance between the two parallel lines (0.312 nm for 111 and 0.270 nm for 200 plane).

Figure 4:
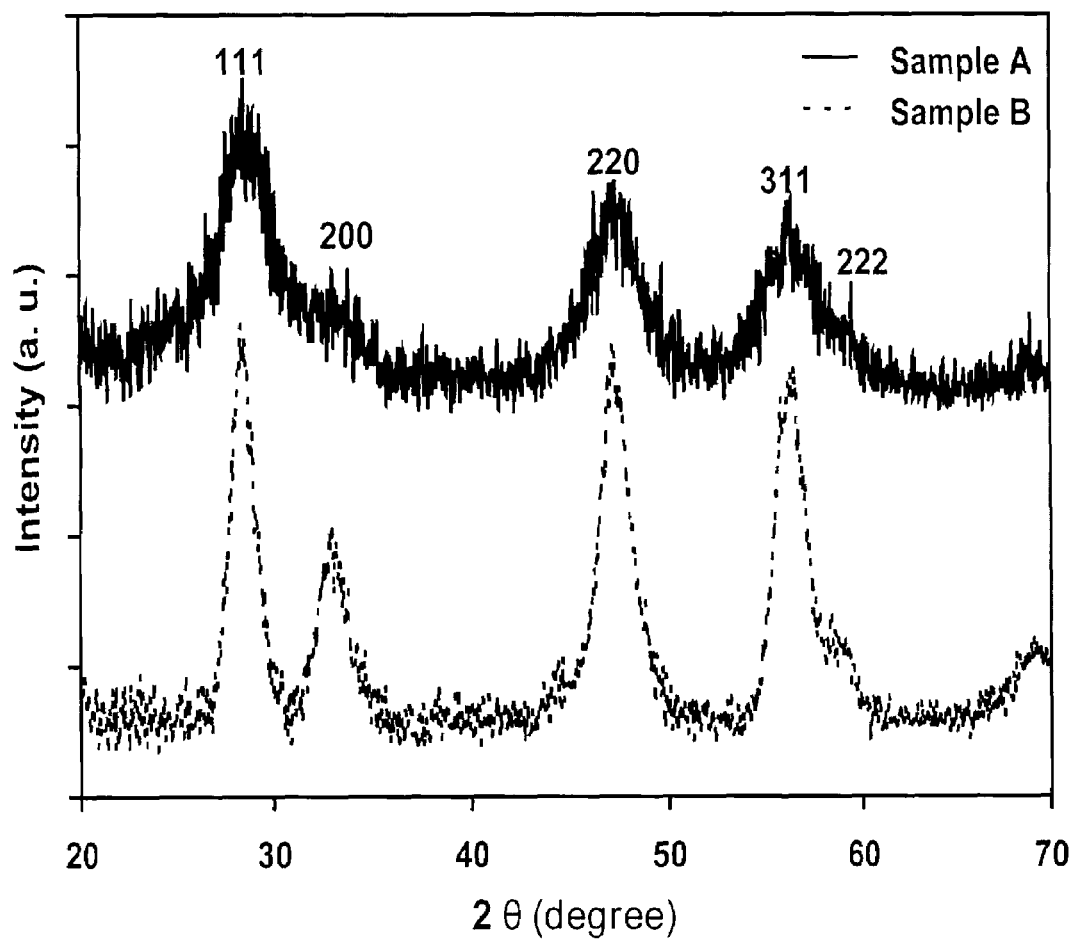
FIG. 4 shows that X-ray diffraction (XRD) analysis reveals a fluorite crystal structure for both preparations (A and B) of ceria nanoparticles.

FIG. 4 shows that XRD analysis reveals a fluorite crystal structure for both preparations (A and B) of ceria nanoparticles. The XRD spectrum for Sample A shows broader peaks than Sample B indicating smaller particle size in the former. Also, the peaks are relatively sharper in Sample B and the 200 peak is more succinct.

We then tested whether nanoceria would affect the level of hydrogen peroxide produced in the presence of superoxide (generated from hypoxanthine/xanthine oxidase). We observed a significant increase in hydrogen peroxide levels produced in the presence of ceria nanoparticles using a coupled horseradish peroxidase assay (data not shown). This increase was observed in both preparations of nanoparticles, but the apparent increase was more dramatic with preparation A. Since we had observed increases in hydrogen peroxide production in the presence of ceria nanoparticles and superoxide, we then tested the activity of ceria nanoparticles in a classic SOD activity assay—competition with cytochrome C for reduction by superoxide. Ferricytochrome C reduction was followed spectrophotometrically by measuring the increase in absorbance at 550 nm. Two thousand units of catalase were added to the reaction to efficiently remove hydrogen peroxide and avoid side reactions with ferricytochrome C or ceria nanoparticles. Ceria nanoparticle concentrations were determined by calculating the average diameter of particles (using TEM, above FIG. 1) in the preparation, and conversion to particle concentration based on total ceria in solution. FIG. 2A shows results when CuZnSOD was added to a reaction where reduction of ferricytochrome C was occurring at a rate of 0.025/minute (A550 nm). One unit of CuZnSOD corresponds to an enzyme concentration of 120 nM. FIG. 2B shows the results of adding ceria nanoparticle preparation A at 15, 30, 45 and 60 nM concentrations. FIG. 2C depicts results when ceria nanoparticles preparation B was added at 5, 15 and 25 nM concentrations. A representative experiment is shown from at least six replicates of each concentration of cerium nanoparticles where the resulting change in the slope of the line (compared to control) varied by less than 20%. Indeed, nanoparticle preparation A efficiently competed with ferricytochrome C for reduction by superoxide (FIG. 2B) in a concentration dependent manner. Preparation B Also Displayed Some Sod Mimetic Activity as Well, But this was far less efficient, as indicated by the poor competition with ferricytochrome C (FIG. 2C). Addition of EDTA at concentrations up to 5 mM did not alter the activity, confirming that adventitious iron or other metal was not catalyzing the activity (data not shown). The concentration of SOD in the reaction shown in FIG. 6A (1 unit addition) is 120 nM. Since this is significantly higher than the particle concentration, this supports the conclusion that each nanoceria molecule is a more efficient catalyst than SOD.

Using a comparative method for SOD kinetic analysis previously described and the known rate constant for reduction of ferricytochrome C by natural superoxide dismutase at pH 7.2 ($1.1 \times 10^5$ $M^{-1}$ $sec^{-1}$), we determined the catalytic rate constant for nanoceria preparation A (with respect to the average nanoparticle) to be $3.6 \times 10^9$ $M^{-1}$ $sec^{-1}$. The most recent kinetic analysis of CuZn SOD calculated a rate constant for SOD between 1.3 and $2.8 \times 10^9$ $M^{-1}$ $sec^{-1}$, depending on the reaction conditions. Thus a single ceria nanoparticle is more efficient as an SOD catalyst than the authentic enzyme itself. Nanoparticles have larger surface energy due to a large surface to volume ratio, and this property makes them more reactive compared to their bulk counterparts. Cerium oxide nanoparticles form oxygen vacancies by giving out oxygen from their crystal lattice. Previous studies have shown that size of ceria nanoparticles negatively correlates with the ratio of Ce3+/Ce4+. The experimental evidence presented here clearly demonstrate that ceria nanoparticles with higher Ce3+/Ce4+ ratio catalyze SOD mimetic activity, yet the molecular mechanism behind this catalysis is still unknown. The SOD mimetic activity exhibited by the vacancy engineered ceria nanoparticles is likely to be the mechanism of action for data previously presented that showed protection of cells against ROS or demonstrated a lifespan extension with treatment with ceria nanoparticles.

Although the 'active site' of the ceria nanoparticle has yet to be firmly established, one can speculate on the reaction mechanism based on that known for SOD. Similarly to Fe and Mn-SOD it is possible that the dismutation of superoxide by ceria nanoparticles may be catalyzed as follows, although the inventors wish not to be bound to this proposed explanation:

$$O_2^- + Ce^{4+} \Longrightarrow O_2 + Ce^{3+}$$

$$O_2^- + Ce^{3+} + 2H^+ \Longrightarrow H_2O_2 + Ce^{4+}$$

Catalysis could occur at the same cerium atom (as in the case with the metal-dependent SOD) or independently at different oxygen vacancy sites.

Accordingly, in the drawings and specification, there has been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A synthetic catalyst providing superoxide dismutase activity, said synthetic catalyst comprising substantially monodispersed nanoparticles of cerium oxide having a crystal lattice containing cerium atoms in mixed valence states of $Ce^{3+}$ and $Ce^{4+}$, the crystal lattice containing a ratio of $Ce^{3+}/Ce^{4+}$ sufficiently large to provide a catalytic rate constant equal to or higher than the catalytic rate constant of natural superoxide dismutase.

2. The synthetic catalyst of claim 1, wherein the superoxide dismutase activity is provided at a catalytic rate higher than $1.1 \times 10^5$ $M^{-1}$ $sec^{-1}$.

3. The synthetic catalyst of claim 1, wherein the superoxide dismutase activity is provided at a catalytic rate of approximately $3.6 \times 10^9$ $M^{-1}$ $sec^{-1}$ than $1.1 \times 10^5$ $M^{-1}$ $sec^{-1}$.

4. The synthetic catalyst of claim 1, wherein the nanoparticles range in size from approximately 1 to 50 μm.

5. The synthetic catalyst of claim 1, wherein the $Ce^{4+}$ valence state predominates.

6. A method of making a synthetic catalyst having superoxide dismutase activity and consisting of a plurality of substantially monodispersed nanoparticles of cerium oxide having a crystal lattice with containing cerium in a mixed valence state of $Ce^{3+}$ and $Ce^{4+}$ wherein the superoxide dismutase activity correlates with number of oxygen vacancies in the crystal lattice, the method comprising:

dissolving hydrous $Ce(NO_3)_3$ in water so as to form a solution;

stirring the solution;

adding hydrogen peroxide and ammonium hydroxide;

heating the solution; and stopping when the solution develops a light yellow color.

7. The method of claim 6, wherein the water is deionized.

8. The method of claim 6, wherein stirring is continuous.

9. The method of claim 6, wherein adding is done rapidly and comprises 30% hydrogen peroxide and 30% ammonium hydroxide.

10. The method of claim 6, wherein heating is at approximately 150° C.

11. A method of treating a biological tissue to reduce oxidative stress, the method comprising contacting the biological tissue with substantially monodispersed nanoparticles of cerium oxide having a crystal lattice containing mixed valence states of $Ce^{3+}$ and $Ce^{4+}$ and sufficient oxygen vacancies to effectively scavenge reactive oxygen species so as to reduce oxidative stress on the biological tissue.

12. The method of claim 11, wherein the biological tissue comprises a tissue culture.

13. The method of claim 11, wherein the biological tissue comprises animal cells.

14. The method of claim 11, wherein the biological tissue comprises mammalian cells.

15. The method of claim 11, wherein the biological tissue comprises human cells.

16. A method of enhancing cell longevity, the method comprising contacting the cell with substantially monodispersed nanoparticles of crystalline cerium oxide containing mixed valence states of $Ce^{3+}$ and $Ce^{4+}$ and bearing sufficient oxygen vacancies to scavenge reactive oxygen species.

17. A method of protecting a cell against irradiation damage, the method comprising contacting the cell with substantially monodispersed nanoparticles of cerium oxide containing mixed valence states of $Ce^{3+}$ and $Ce^{4+}$ in a crystal lattice having sufficient oxygen vacancies to effectively scavenge reactive molecular species generated by the irradiation.

18. A method of catalyzing conversion of superoxide into hydrogen peroxide, the method comprising contacting the superoxide with one or more nanoparticles of cerium oxide having a crystal lattice containing mixed valence states of $Ce^{3+}$ and $Ce^{4+}$ and with sufficient oxygen vacancies to function effectively as a synthetic equivalent to superoxide dismutase.

* * * * *

UNITED STATES PATENT AND TRADEMARK OFFICE
CERTIFICATE OF CORRECTION

| | | |
|---|---|---|
| PATENT NO. | : 7,504,356 B1 | Page 1 of 1 |
| APPLICATION NO. | : 11/676579 | |
| DATED | : March 17, 2009 | |
| INVENTOR(S) | : William T. Self and Sudipta Seal | |

It is certified that error appears in the above-identified patent and that said Letters Patent is hereby corrected as shown below:

Column 1, Lines 14-16: Cancel the text "The invention was made with at least partial Government support and the Government may have certain rights in the invention, as specified by law." and replace it with the following: --The invention was made with government support under grant BES0541516 awarded by the National Science Foundation. The government has certain rights in the invention.--

Signed and Sealed this
Second Day of April, 2013

Teresa Stanek Rea
*Acting Director of the United States Patent and Trademark Office*